Patented Aug. 29, 1961

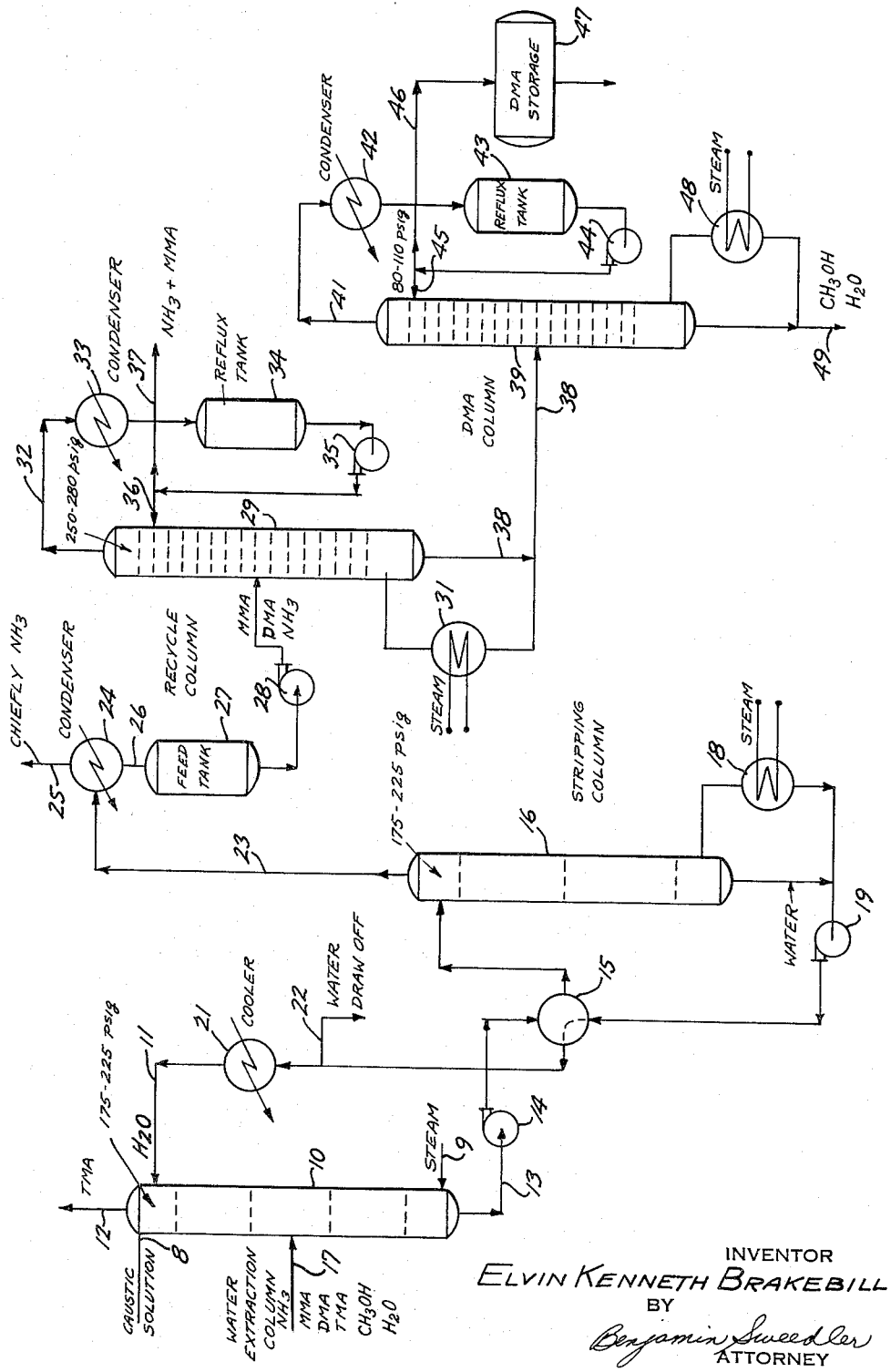

2,998,355
PROCESS FOR ISOLATING DIMETHYLAMINE FROM MIXTURE CONTAINING SAME, OTHER AMINES AND AMMONIA
Elvin Kenneth Brakebill, Hopewell, Va., assignor to Allied Chemical Corporation, New York, N.Y., a corporation of New York
Filed July 1, 1959, Ser. No. 824,328
6 Claims. (Cl. 202—39.5)

This invention relates to a distillation process for effecting separation of mixtures containing chiefly ammonia, methanol, water and mono-, di-, and trimethylamines to recover substantially pure dimethylamine, an important intermediate in the manufacture of dimethylformamide, antihistamines, detergents, depilatories, fungicides, herbicides, rubber accelerators, ion exchange resins and unsymmetrical dimethylhydrazine used as a fuel in the guided missile and rocket fields.

Such mixtures are produced, for example, in the catalytic synthesis of amines by reaction of methanol and ammonia in the presence of a dehydration catalyst, such, for example, as alumina. The isolation of dimethylamine from such reaction mixtures has been the subject of much research and development work. Suggested distillation procedures for separating such reaction mixtures into their components are objectionable for a number of reasons, among which may be mentioned that they are excessively complicated.

It is among the objects of the present invention to provide a relatively simple process for the distillation of such mixtures to produce dimethylamine of high purity, efficiently and economically.

It is another object of this invention to provide such process which results in the recovery of ammonia, methanol and other amines in a form permitting their ready return to the reactor where methanol and ammonia are reacted to produce amines so that the ultimate product of the reactor is the desired dimethylamine.

Other objects and advantages of this invention will be apparent from the following detailed description thereof.

In accordance with a preferred embodiment of this invention, the reactor effluent containing as its chief constituents unreacted methanol and ammonia, water, mono-, di- and trimethylamines is introduced in the liquid phase in the first of a series of four distillation columns, where it is subjected to extractive distillation, the vapors flowing countercurrent to a descending stream of water and the distillation being effected at a pressure of 175 to 225 p.s.i.g. and a temperature at the top of the column of from 110° C. to 120° C. and at the bottom of this column of from 70° C. to 80° C. This column is hereinafter and on the drawing referred to as the water extraction column. About 90–98% of the trimethylamine is thus taken off overhead, condensed and sent to a tank for recycle to the reactor, if it is desired to carry out the process to produce dimethylamine as the sole ultimate product.

Water from any convenient source is introduced into the water extraction column; preferably this water is obtained by stripping the bottoms from the water extraction column in a second column, hereinafter referred to and on the drawing identified as the stripping column. This stripping column operates at a pressure of from 175 to 25 p.s.i.g., and a temperature at the base of the column of from 175° C. to 225° C. and at the top of the column of from 65° C. to 75° C. The water removed as bottoms from the stripping column is cooled by passage in indirect heat exchange relation with the bottoms from the first column and then further cooled by any suitable cooler to enter the top of the first column at a temperature of from about 70° C. to 120° C.

The overhead from the stripping column consisting chiefly of ammonia, monomethylamine, dimethylamine, residual trimethylamine and a small amount of methanol and water is subjected to partial condensation to leave as vapor a fraction comprising mostly ammonia and produce as condensate a fraction contining residual ammonia, most of the amines and all of the alcohol and water. The vapor fraction is passed to a condenser where it is condensed, producing a liquid ammonia solution which can be recycled to the reactor.

The condensate from the partial condenser is pumped into a third distillation column, hereinafter referred to and on the drawing identified as the recycle column. This recycle column operates at a pressure of from 250 to 280 p.s.i.g., i.e. at a higher pressure than the other columns. The temperature near the base of this column is from 110° C. to 130° C. and at the top from 50° C. to 60° C. In this column vapors rise countercurrent to a descending stream of reflux liquid, producing as overhead a vapor stream containing all of the residual ammonia and a small amount of monomethylamine and trimethylamine. These vapors are condensed, a portion of the condensate is used for reflux in the recycle column, and the remainder sent to a storage tank from which it can be passed to the reactor. The condensate thus passed for recycle to the reactor contains ammonia, monomethylamine and the residual trimethylamine; thus the recycle column provides for the recycle through the reactor of the bulk of the unreacted ammonia, and the monomethylamine.

The bottoms from the recycle column is introduced at an intermediate point of a fourth column, hereinafter referred to and identified on the drawing as the DMA column. This DMA column is operated at a pressure of 80 to 110 p.s.i.g., a temperature at its base of from 110° C. to 130° C. and at its top of 65° C. to 75° C. The bottoms from this column containing the methanol and residual water can be recycled to the reactor. The vapors coming off overhead are condensed, a portion is returned as reflux liquid to the column and the remainder consisting of dimethylamine of high purity is withdrawn as product.

Thus the present invention involves distilling a mixture of methylamines and ammonia while subjecting it to water extraction under a pressure of 175 to 225 p.s.i.g. to effect removal of most of the trimethylamine, the stripping of the residue from this distillation at a pressure of 175 to 225 p.s.i.g. to effect removal of most of the water as bottoms, taking off overhead a vapor mixture containing residual trimethylamine, ammonia, and mono- and dimethylamines, condensing the vapor mixture containing the residual ammonia and the amines, and distilling this condensate under a higher pressure of from about 250 and 280 p.s.i.g. to drive off ammonia and monomethylamine, and subjecting the bottoms containing chiefly dimethylamine from this distillation step to distillation in a column under a pressure of about 80 to 110 p.s.i.g. to take off overhead dimethylamine of relatively high purity as product.

The accompanying drawing is a flow sheet which shows for purposes of exemplification a preferred arrangement of distillation equipment for practicing the process of the present invention.

In the drawing, 10 is the water extraction column which is a packed column of any conventional type. This column is supplied with water at its top through line 11, has a vapor exit line 12 at its top and communicates at its base through line 13 with a pump 14 which feeds bottoms from column 10 through heat exchanger 15 to the top of stripping column 16. Water extraction column 10 is supplied with the reactor effluent at approximately its mid point through line 17, which line communicates with the cooler or condensers (not shown) supplied with reactor effluent from the dimethylamine reactor. Steam is added near the bottom of water extraction column 10 through line 9. A caustic solution inlet line 8 is provided at the top of the column for addition of caustic when carbon dioxide is present to react therewith and form sodium carbonate. The amount of caustic thus added is enough to react with all carbon dioxide present. Usually about 1% based on the weight of water supplied to this column will suffice. The carbonate thus formed is removed in the water bleedoff from the system.

Stripping column 16 is a packed column of any conventional type. It is provided at its base with a steam boiler 18. A bottoms pump 19 communicates with column 16 pumping the water withdrawn from the base of column 16 through heat exchanger 15 and cooler 21 to line 11 leading into the top of the water extraction column 10. The line leading into the cooler 21 is provided with a branch line 22 for removing from the system a portion of the water and thus maintain the water circulation system between the stripping column 16 and the water extraction column 10 in balance.

Stripping column 16 has at its top a vapor line 23 which communicates with condenser 24 effecting partial condensation of the vapors passing therethrough. Vapor line 25 leads from condenser 24. Through this line passes the uncondensed vapor consisting chiefly of ammonia. Line 25 may communicate with a condenser not shown, which in turn discharges into a tank communicating with the reactor for recycle of the condensed ammonia to the reactor.

A line 26 leads from condenser 24 to the recycle column feed tank 27 communicating through pump 28 with an intermediate point of the recycle column 29. This column 29 may be a conventional plate column. Column 29 is provided with a steam boiler 31 communicating with its base. A vapor take-off 32 leads from its top to a condenser 33. This condenser feeds into the reflux tank 34 which communicates with reflux pump 35. This pump 35 feeds condensate into a line, one branch 36 of which leads into the top of the recycle column 29 for return of reflux liquid thereto. The other branch 37 communicates with a storage tank not shown. A liquid stream consisting primarily of ammonia and monomethylamine is thus withdrawn continuously through branch 37 for recycle to the reactor when desired.

Recycle column 29 communicates through a line 38 for flow of bottoms therethrough to an intermediate point of DMA column 39. This DMA column may be a conventional plate column. The vapor line 41 from DMA column leads to a condenser 42, which communicates with a reflux tank 43. Reflux liquid from tank 43 is pumped by pump 44 into a branch line, one branch 45 of which communicates with the top of DMA column for return of reflux liquid thereto. The other branch 46 leads to the DMA storage tank 47. A steam boiler 48 communicates with the bottom of DMA column 39. The bottoms are recirculated through the boiler 48, thus supplying heat for effecting the distillation in column 39. A line 49 leads from the circulating system for withdrawal of bottoms constituted chiefly of methyl alcohol and water from DMA column 39.

It will be appreciated that the capacity of the equipment, i.e. the number of plates in recycle column 29 and DMA column 39 and their height and cross-sectional area as well as those of the other columns will differ for different installations and will depend primarily on the desired dimethylamine capacity. The material of construction of the equipment should be chemically inert to the components of the reactor effluent. Carbon steel is satisfactory for all equipment shown in the drawing.

The following examples are given for illustrative purposes; it will be understood the invention is not limited to these examples. The examples are carried out in equipment such as shown in the drawing. In the examples, the units of quantity are in pounds per hour; all references to pounds in the example mean pounds per hour. It will be appreciated the flow through the equipment is continuous.

*Example I*

Reactor effluent at a temperature of 56° C. in amount of 28,500 pounds is introduced at the mid point of the water extraction column under a pressure of 200 p.s.i.g. This reactor effluent contains approximately 6,250 pounds of ammonia, 3,000 pounds of monomethylamine, 3,900 pounds of dimethylamine, 11,300 pounds of trimethylamine, 180 pounds of methanol, 3,600 pounds of water, and the rest inerts. Steam is supplied to the bottom of the water extraction column. Water removed from the stripping column is pumped into the top of the water extraction column; about 3,000 pounds of water are removed through line 22. There is taken off overhead from the water extraction column at a temperature of 78° C., 11,000 pounds containing 10,200 pounds of trimethylamine, 45 pounds of dimethylamine, 60 pounds of monomethylamine, 105 pounds of ammonia and the rest water.

The bottoms from this water extraction column in amount of 37,300 pounds, containing approximately 6,100 pounds of ammonia, 3,000 pounds monomethylamine, 4,000 pounds dimethylamine, 1,100 pounds of trimethylamine, 175 pounds of methanol, and the rest water, after cooling by heat exchange in exchanger 15 with the hot water from the stripping column, is introduced into the top of the stripping column operated at a pressure of 200 p.s.i.g. There is taken off overhead from the stripping column 14,300 pounds of a vapor mixture containing 6,100 pounds ammonia, 3,000 pounds monomethylamine, 3,800 pounds dimethylamine, 1,100 pounds of trimethylamine, and 175 pounds of methanol and the rest water.

This vapor mixture is partially condensed and thus separated into two fractions, one vapor and the other a condensate fraction. The vapor fraction in amount of 2,500 pounds contains approximately 1,700 pounds of ammonia, 350 pounds monomethylamine, 150 pounds dimethylamine and 300 pounds trimethylamine.

The condensate fraction is introduced at the mid point of the recycle column operated at a pressure of 260 p.s.i.g. where it is subjected to reflux distillation. The vapors coming off at 55° C. are condensed and separated into two fractions, one of which is returned as reflux and the other removed. About 7,750 pounds are thus removed containing approximately 4,400 pounds of ammonia (the rest of the ammonia), 2,500 pounds of monomethylamine, 50 pounds of dimethylamine and 800 pounds trimethylamine. There is removed as bottoms from the recycle column at a temperature of 120° C. approximately 3,900 pounds containing 30 pounds of monomethylamine, 3,600 pounds of dimethylamine, 180 pounds methanol and the rest water.

The bottoms from the recycle column is subjected to distillation in the DMA column at a pressure of 90 p.s.i.g. The vapors taken off overhead at 70° C. are condensed, a portion of the condensate returned to this column as reflux liquid and the rest removed as product. About 3,550 pounds of dimethylamine are thus removed containing a small amount, about 30 pounds, of monomethylamine. The purity of this product is about 99%. There is removed as bottoms at a temperature of 120° C. from the DMA column approximately 270 pounds consisting of approximately 180 pounds of methanol and 90 pounds of water.

*Example II*

Reactor effluent at a temperature of 56° C. in amount of 24,500 pounds is introduced at the mid point of the water extraction column under a pressure of 200 p.s.i.g. This reactor effluent contains approximately 5,400 pounds of ammonia, 2,600 pounds of monomethylamine, 3,375 pounds of dimethylamine, 9,800 pounds of trimethylamine, 160 pounds of methanol, 3,075 pounds of water, and the rest inerts including carbon dioxide. Steam is supplied to the bottom of the water extraction column. Water removed from the stripping column is pumped into the top of the water extraction column together with about 1% NaOH based on the water fed; about 3,000 pounds of water are removed through line 22. There is taken off overhead from the water extraction column at a temperature of 78° C., 9,875 pounds containing 9,310 pounds of trimethylamine, 45 pounds of dimethylamine, 60 pounds of monomethylamine, 105 pounds of ammonia and the rest water.

The bottoms from this water extraction column in amount of 37,200 pounds, containing approximately 5,290 pounds of ammonia, 2,540 pounds monomethylamine, 3,330 pounds dimethylamine, 490 pounds of trimethylamine, 160 pounds of methanol, a small amount of carbonate and the rest water, after cooling by heat exchange in exchanger 15 with the hot water from the stripping column, is introduced into the top of the stripping column operated at a pressure of 200 p.s.i.g. There is taken off overhead from the stripping column 11,890 pounds of a vapor mixture containing 5,290 pounds ammonia, 2,540 pounds monomethylamine, 3,330 pounds dimethylamine, 490 pounds of trimethylamine, and 160 pounds of methanol and the rest water.

This vapor mixture is partially condensed and thus separated into two fractions, one vapor and the other a condensate fraction. The vapor fraction in amount of 2,130 pounds contains approximately 1,580 pounds of ammonia, 310 pounds monomethylamine, 180 pounds dimethylamine and 60 pounds trimethylamine.

The condensate fraction is introduced at the mid point of the recycle column operated at a pressure of 260 p.s.i.g. where it is subjected to reflux distillation. The vapors coming off at 55° C. are condensed and separated into two fractions, one of which is returned as reflux and the other removed. About 6,650 pounds are thus removed containing approximately 3,975 pounds of ammonia (the rest of the ammonia), 2,200 pounds of monomethylamine, 45 pounds of dimethylamine and 430 pounds trimethylamine. There is removed as bottoms from the recycle column at a temperature of 120°C. approximately 3,110 pounds containing 30 pounds of monomethylamine, 2,830 pounds of dimethylamine, 160 pounds methanol and the rest water.

The bottoms from the recycle column is subjected to distillation in the DMA column at a pressure of 90 p.s.i.g. The vapors taken off overhead at 70° C. are condensed, a portion of the condensate returned to this column as reflux liquid and the rest removed as product. About 2,830 pounds of dimethylamine are thus removed with a small amount, about 30 pounds, of monomethylamine. The purity of this product is about 99%. There is removed as bottoms at a temperature of 120° C. from the DMA column approximately 250 pounds consisting of approximately 160 pounds of methanol and 90 pounds of water.

It will be noted the present invention provides a relatively simple process for the distillation of mixtures of ammonia and methylamines, with or without methanol, to produce dimethylamine of high purity, efficiently and economically. Moreover the separate components of the mixture, particularly the trimethylamine, monoethylamine and ammonia, are separated in a form permitting their ready recycle to the dimethylamine reactor so that dimethylamine in effect becomes the sole reaction product of the reactor.

Since certain changes may be made in carrying out the above described distillation method without departing from the scope of the invention, it is intended that all matter contained in the above description shall be interpreted as illustrative and not in a limiting sense.

What is claimed is:

1. A process for isolating dimethylamine from mixtures containing dimethylamine, monomethylamine, trimethylamine and ammonia, which comprises introducing said mixtures in the liquid phase at an intermediate point in a distillation column operated at a pressure of from 175 to 225 p.s.i.g., flowing the resultant vapors countercurrent to a descending stream of water, taking off trimethylamine overhead and removing as bottoms a stream containing residual trimethylamine, monomethylamine, dimethylamine, ammonia and water; subjecting this bottoms stream to distillation in a second column under a pressure of from 175 to 225 p.s.i.g. to remove overhead the residual trimethylamine, dimethylamine, monomethylamine, ammonia and water, and remove water as bottoms from this second column; condensing the vapors removed overhead from the second column; and subjecting the condensate thus produced to distillation in a third column at a pressure of 250 to 280 p.s.i.g. to separate overhead substantially all of the ammonia and monomethylamine from the dimethylamine which is removed as bottoms from said third column.

2. The process as defined in claim 1, in which caustic solution is introduced into the upper portion of the first mentioned column and flows downwardly countercurrent to the rising vapor stream.

3. A process for producing substantially pure dimethylamine from mixtures containing dimethylamine, monomethylamine, trimethylamnie and ammonia, which comprises introducing said mixtures in the liquid phase at an intermediate point in a distillation column operated at a pressure of from 175 to 225 p.s.i.g. flowing the resultant vapors countercurrent to a descending stream of water, taking off overhead the trimethylamine, removing as bottoms from this distillation column a stream containing residual trimethylamine, monomethylamine, dimethylamine, ammonia and water; subjecting this bottoms stream to distillation in a second column under a pressure of from 175 to 225 p.s.i.g. to remove overhead the residual trimethylamine, dimethylamine, monomethylamine, ammonia and a small amount of water and removing water as bottoms from this second column; partially condensing the vapors removed overhead from said second column to condense a portion of the ammonia and most of the monomethylamine, dimethylamine and trimethylamine leaving as vapors the rest of the ammonia admixed with small amounts of monomethylamine and dimethylamine; introducing the condensate from said partial condensation at an intermediate point into a third distillation column under a pressure of from 250 to 280 p.s.i.g. and subjecting it to reflux distillation, removing as bottoms from this third column a mixture of monomethylamine and dimethylamine containing a small amount of water and taking off overhead from this third column the rest of the ammonia admixed with a small amount of monomethylamine and dimethylamine, condensing the vapors thus taken off overhead and dividing the condensate into two streams, one of which is returned to said third column as reflux and the other removed; and subjecting the bottoms from said third column to distillation in a fourth column at a pressure of from 80 to 110 p.s.i.g., removing dimethylamine overhead from this fourth column as vapor, condensing the vapor, returning a portion of the condensate as reflux to the fourth column, and removing the remainder as substantially pure dimethylamine product.

4. A process for producing substantially pure dimethylamine from mixtures containing dimethylamine, monomethylamine, trimethylamine and ammonia, which comprises introducing said mixtures in the liquid phase at an intermediate point in a distillation column operated at a pressure of from 175 to 225 p.s.i.g. flowing the resultant vapors countercurrent to a descending stream of water, taking off trimethylamine overhead at a temperature of from 70° C. to 80° C. and removing as bottoms from this distillation column a stream containing residual trimethylamine, monomethylamine, dimethylamine, ammonia and water; subjecting this stream to distillation in a second column under a pressure of from 175 to 225 p.s.i.g. to remove overhead the residual trimethylamine, dimethylamine, monomethylamine, ammonia and a small amount of water and removing as bottoms from this second column water which after cooling is employed in the first mentioned column; partially condensing the vapors removed overhead from the second column to condense a portion of the ammonia and most of the monomethylamine, dimethylamine and trimethylamine leaving as vapors the rest of the ammonia admixed with small amounts of monomethylamine and dimethylamine, condensing these vapors and collecting the condensate; introducing the said condensate from the partial condensation containing most of the amines and the rest of the ammonia at an intermediate point into a third distillation column under a pressure of from 250 to 280 p.s.i.g. and subjecting it to reflux distillation, removing as bottoms from this column a mixture of monomethylamine and dimethylamine containing a small amount of water, taking off overhead from this column the rest of the ammonia admixed with a small amount of monomethylamine and dimethylamine, condensing the vapors thus taken off overhead and dividing the condensate into two streams, one of which is returned to the third column as reflux and the other removed; and subjecting the bottoms removed from said third column to distillation in a fourth column at a pressure of from 80 to 110 p.s.i.g., removing overhead dimethylamine from this fourth column as vapor, condensing the vapor, returning a portion of the condensate as reflux to the fourth column, and removing the remainder as substantially pure dimethylamine product.

5. A process for producing substantially pure dimethylamine from a mixture containing dimethylamine, monomethylamine, trimethylamine, ammonia, methanol and water which comprises introducing said mixture in the liquid phase at an intermediate point in a distillation column operated at a pressure of from 175 to 225 p.s.i.g., flowing the resultant vapors countercurrent to a descending stream of water, taking off trimethylamine overhead at a temperature of from 70° C. to 80° C., removing as bottoms from this distillation column a stream containing residual trimethylamine, monomethylamine, dimethylamine, ammonia, methanol and water; subjecting this stream to distillation in a second column under a pressure of from 175 to 225 p.s.i.g. to remove overhead the residual trimethylamine, dimethylamine, monomethylamine, ammonia and a small amount of water, removing water as bottoms from this second column which water after cooling is employed in the first mentioned column; partially condensing the vapors removed overhead from the second column to condense a portion of the ammonia and most of the monomethylamine, dimethylamine, some trimethylamine and methanol leaving as vapors the rest of the ammonia admixed with small amounts of monomethylamine and dimethylamine, condensing these vapors and collecting the condensate, introducing the said condensate from the partial condensation containing most of the amines, the rest of the ammonia and the methanol at an intermediate point into a third distillation column under a pressure of from 250 to 280 p.s.i.g. and subjecting it therein to reflux distillation, removing as bottoms from this column a mixture of monomethylamine, dimethylamine, methanol and water, taking off overhead from this column as vapor the rest of the ammonia admixed with a small amount of monomethylamine and dimethylamine, condensing the vapor thus taken off overhead and dividing the condensate into two streams, one of which is returned to the third column as reflux and the other removed; and subjecting the bottoms from said third column to distillation in a fourth column at a pressure of from 80 to 110 p.s.i.g., removing overhead dimethylamine from this fourth column as vapor, condensing the vapor, returning a portion of the condensate as reflux to the fourth column, removing the remainder as substantially pure dimethylamine product, and removing as bottoms from said fourth column a mixture of methanol and water.

6. A process for isolating dimethylamine from mixtures containing dimethylamine, monomethylamine, trimethylamine and ammonia, which comprises introducing said mixtures in the liquid phase at an intermediate point in a distillation column operated at a pressure of from 175 to 225 p.s.i.g., flowing the resultant vapors countercurrent to a descending stream of water, taking off trimethylamine overhead and removing as bottoms a stream containing residual trimethylamine, monomethylamine, dimethylamine, ammonia and water; subjecting this bottoms stream to distillation in a second column under a pressure of from 175 to 225 p.s.i.g. to remove overhead the residual trimethylamine, dimethylamine, monomethylamine, ammonia and water, and remove water as bottoms from this second column; partially condensing the vapors removed overhead from the second column to condense a portion of the ammonia and most of the monomethylamine, dimethylamine and trimethylamine leaving as vapors the rest of the ammonia admixed with small amounts of monomethylamine and dimethylamine; and subjecting the condensate thus produced to distillation in a third column at a pressure of 250 to 280 p.s.i.g. to separate overhead the rest of the ammonia and monomethylamine from the dimethylamine which is removed as bottoms from said third column.

References Cited in the file of this patent
UNITED STATES PATENTS

| | | |
|---|---|---|
| 2,045,929 | Swallen | June 30, 1936 |
| 2,206,584 | Spence | July 2, 1940 |
| 2,222,559 | Boeckeler | Nov. 19, 1940 |
| 2,570,291 | Tyerman | Oct. 9, 1951 |
| 2,807,574 | Hirano et al. | Sept. 24, 1957 |
| 2,848,386 | Kramis | Aug. 19, 1958 |

UNITED STATES PATENT OFFICE
CERTIFICATE OF CORRECTION

Patent No. 2,998,355 August 29, 1961

Elvin Kenneth Brakebill

It is hereby certified that error appears in the above numbered patent requiring correction and that the said Letters Patent should read as corrected below.

Column 1, line 66, for "25" read -- 225 --; column 2, line 8, for "contining" read -- containing --; line 56, for "and", first occurrence, read -- to --; column 6, line 31, for "trimethylamnie" read -- trimethylamine --; lines 34 and 74, after "225 p.s.i.g.", each occurrence, insert a comma.

Signed and sealed this 30th day of January 1962.

(SEAL)
Attest:

ERNEST W. SWIDER
Attesting Officer

DAVID L. LADD
Commissioner of Patents